United States Patent
Brenneis et al.

(10) Patent No.: US 6,684,593 B2
(45) Date of Patent: Feb. 3, 2004

(54) INTEGRAL STRUCTURAL SHELL COMPONENT FOR AN AIRCRAFT AND METHOD OF MANUFACTURING THE SAME

(75) Inventors: Hartmut Brenneis, Duedenbuettel (DE); Walter Zink, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/792,424

(22) Filed: Feb. 22, 2001

(65) Prior Publication Data

US 2001/0015043 A1 Aug. 23, 2001

(30) Foreign Application Priority Data

Feb. 22, 2000 (DE) .......................................... 100 07 995

(51) Int. Cl.$^7$ ............................... E04C 2/38; B64C 1/00
(52) U.S. Cl. .......................................... 52/630; 244/119
(58) Field of Search ............................ 52/630; 244/119, 244/123, 118.2

(56) References Cited

U.S. PATENT DOCUMENTS

| | | | | |
|---|---|---|---|---|
| 1,594,609 | A | * | 8/1926 | Frease |
| 1,710,350 | A | * | 4/1929 | Dewoitine |
| 1,963,416 | A | * | 6/1934 | Minshall ..................... 52/735.1 |
| 2,371,754 | A | * | 3/1945 | Gillum |
| 2,952,341 | A | * | 9/1960 | Weiler |
| 3,071,217 | A | * | 1/1963 | Gould ........................ 52/403.1 |
| 3,096,958 | A | * | 7/1963 | Koontz ........................ 244/123 |
| 3,438,164 | A | * | 4/1969 | Duepree |
| 4,035,536 | A | | 7/1977 | Morrison |
| 4,557,440 | A | | 12/1985 | Adams |
| 5,242,523 | A | * | 9/1993 | Willden et al. ............. 156/285 |
| 5,251,849 | A | * | 10/1993 | Torres .................... 244/117 R |
| 5,262,220 | A | | 11/1993 | Spriggs et al. |
| 5,317,848 | A | * | 6/1994 | Abbey |
| 5,451,377 | A | * | 9/1995 | Asher et al. ................ 428/167 |
| 5,841,098 | A | | 11/1998 | Gedrat et al. |
| 5,876,023 | A | * | 3/1999 | Hain et al. ................ 267/141.4 |
| 6,105,902 | A | * | 8/2000 | Pettit ........................... 244/119 |
| 6,114,012 | A | * | 9/2000 | Amaoka et al. ............. 428/182 |
| 6,190,484 | B1 | * | 2/2001 | Appa .......................... 156/189 |
| 6,213,426 | B1 | | 4/2001 | Weber et al. |
| 6,296,224 | B1 | * | 10/2001 | Hayakawa |
| 6,364,250 | B1 | * | 4/2002 | Brinck et al. ............... 244/119 |
| 6,511,570 | B2 | * | 1/2003 | Matsui ........................ 156/245 |

FOREIGN PATENT DOCUMENTS

DE  19844035  11/1999

OTHER PUBLICATIONS

Peter Heider, "Lasergerechte Konstruktion und lasergerechte Fertigungsmittel zum Schweissen grossformatiger Aluminium–Strukturbauteile" ("Laser Compatible Construction and Laser Compatible Manufacturing Means for Welding Large–Format Aluminum Structural Components"), published by the VDI Verlag Publishers in VDI Fortschritt–Berichte ("Progress Reports"), Series 2: Fertigungstechnik ("Manufacturing Technology"), No. 326, Dissertation Jul. 1994, especially at pp. 3 to 5.

\* cited by examiner

Primary Examiner—Carl D. Friedman
Assistant Examiner—Kevin McDermott
(74) Attorney, Agent, or Firm—W. F. Fasse; W. G. Fasse

(57) ABSTRACT

A structural panel component, such as an aircraft fuselage shell component, includes a single integral part having longitudinal and crosswise stiffening elements integrally arranged on a skin sheet. This integral component has been formed by a high speed milling chip removal process applied to a solid plate-shaped semi-finished starting material. The skin sheet has areas of differing thicknesses, and the height, thickness, and spacing of the stiffening elements varies as needed, depending on the local loading conditions that will prevail on the finished structural component. The configuration of the component can be optimized to minimize the weight while satisfying all load strength requirements. The manufacturing method is very simple and economical.

25 Claims, 4 Drawing Sheets

INTEGRAL STRUCTURAL SHELL COMPONENT FOR AN AIRCRAFT AND METHOD OF MANUFACTURING THE SAME

PRIORITY CLAIM

This application is based on and claims the priority under 35 U.S.C. §119 of German Patent Application 100 07 995.4, filed on Feb. 22, 2000.

FIELD OF THE INVENTION

The invention relates to a structural panel component, and particularly a curved structural shell component that is especially for an aircraft fuselage, and that includes at least one skin sheet as well as stiffening elements thereon. The invention further relates to a method of manufacturing such a structural component.

BACKGROUND INFORMATION

The present day conventional fabrication of large format structural components, and particularly the fuselage shell components for aircraft, typically uses skin sheets having dimensions of approximately 2.5 m by 10 m. The maximum largest possible size of the skin sheets is typically used for fabricating the fuselage shell, in order to minimize the number of the longitudinal and circumferential or transverse joints of the finished fuselage, and thereby reduce the weight and the fabrication effort and expense of the aircraft fuselage. Minimizing the structural weight of the fuselage is a very important factor in the manufacture of aircraft, with regard to the ever present effort to reduce the fuel consumption and therefore improve the economy of operating the aircraft.

Such a weight minimization of the fuselage requires a structure-mechanical optimization of the fuselage shell structure, so that, for example, the skin sheets must have different thicknesses at different areas depending on the respective loads that will prevail at each respective area. This aims to avoid the weight penalty of otherwise having an unnecessary excess thickness at any given area of the fuselage shell that will be subjected to below-average loading. Similarly, areas of the fuselage shell that will be subjected to above-average loading can be provided with a thicker fuselage skin (and/or stronger stringers and frames), without unnecessarily thickening other areas of the fuselage shell. For example, it may be necessary to provide a thickening of the fuselage skin metal sheet in the area of each stringer joint for proper load introduction.

The various different thickness areas of the skin sheet are typically conventionally achieved by riveting or adhesively bonding a doubling or thickening sheet onto the base skin sheet. Alternatively, a reduction of thickness of the fuselage skin can be achieved by mechanical milling or by chemical milling and material removal at these areas. This process of chemical milling and material removal of a skin sheet is carried out by masking the skin sheet, cutting and partially removing portions of the mask at areas that are to be etched, and then applying an etching chemical to remove material from the exposed surface areas, followed by neutralizing, cleaning, etc.

In order to strengthen and support the skin sheet and thereby fabricate the structural shell component, longitudinally extending stringers are typically riveted or adhesively bonded onto the fuselage skin. Then, crosswise or circumferentially extending frames are joined onto the structure being fabricated, by first riveting angle elements, i.e. so-called clips, onto the skin sheet and the stringers. Then the frames are joined onto the clips.

The above described conventional fabrication process for manufacturing a fuselage shell structure is rather complicated, time consuming, and costly. Such a process is described in greater detail in an article by Peter Heider entitled "Lasergerechte Konstruktion und lasergerechte Fertigungsmittel zum Schweissen grossformatiger Aluminium-Strukturbauteile" ("Laser Compatible Construction and Laser Compatible Manufacturing Means for Welding Large-Format Aluminum Structural Components"), published by the VDI Verlag Publishers in VDI Fortschritt-Berichte ("Progress Reports"), Series 2: Fertigungstechnik ("Manufacturing Technology"), No. 326, Dissertation July/ 1994, especially at pages 3 to 5.

German Patent DE 198 44 035 discloses a method of fabricating large format structural components, as well as different possible manners of construction of a structural component, which use a laser beam welding process for joining a stiffening structure onto the fuselage skin. Particularly, the stringers running in the longitudinal direction of the aircraft are laser welded onto the skin sheet. From this prior art reference it is also known to embody the frames or frame elements that run in the crosswise or circumferential direction in a weldable manner. Thus, the overall structural component is realized predominantly by welding together numerous individual parts.

Figure 3:
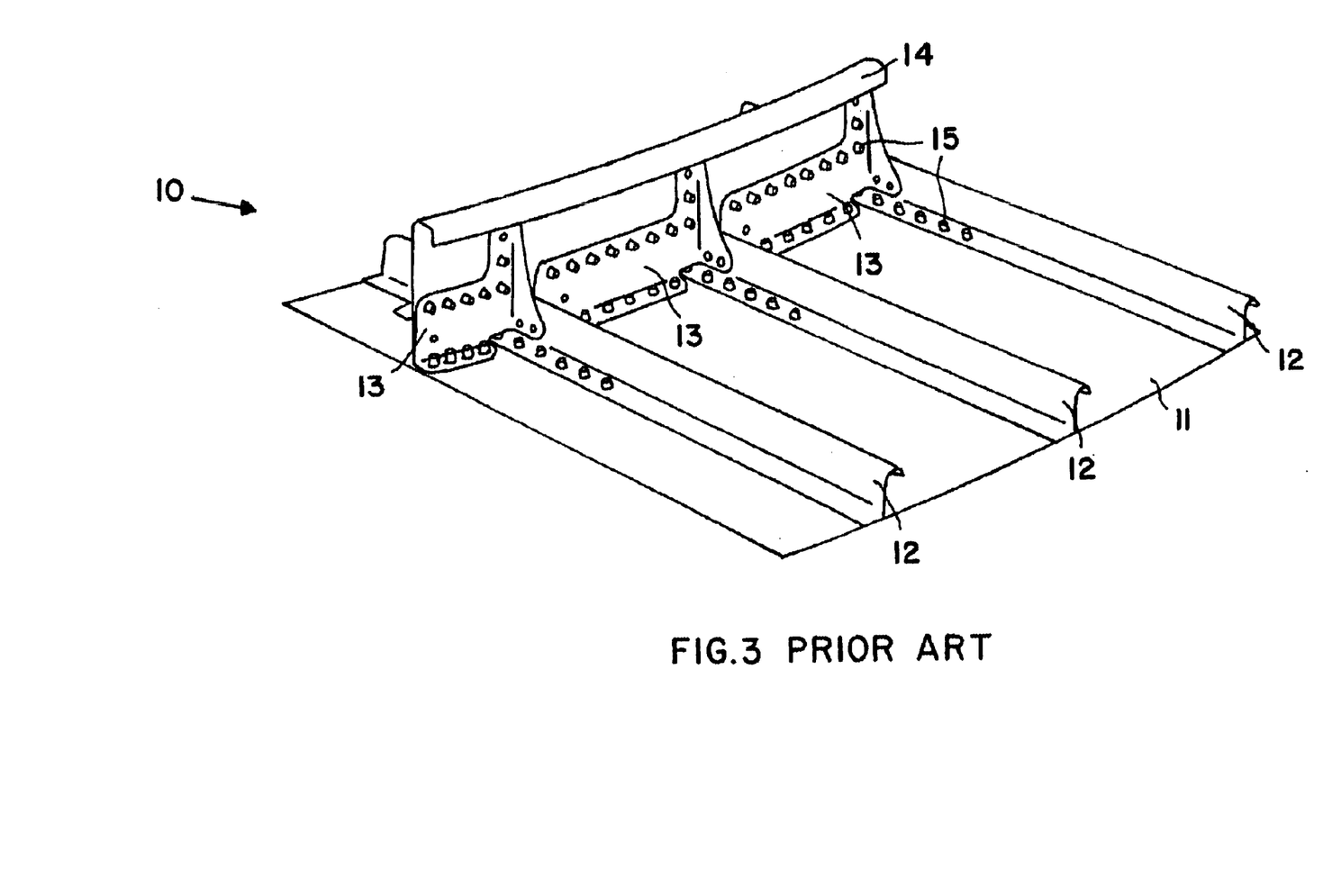
FIG. 3 is a schematic perspective view of a portion of an aircraft fuselage shell component fabricated by conventional techniques.

FIG. 3 of the present application shows a representative example of a conventionally fabricated aircraft fuselage shell 10, including a skin sheet 11 with stringers 12 arranged and joined thereon. Particularly, the stringers 12 may be riveted or adhesively bonded onto the skin sheet 11. Before carrying out such an adhesive bonding process, all of the individual parts must be subjected to a special pretreatment process, including degreasing, cleaning, pickling or etching, anodizing in a chromic acid solution, and finally being coated with a primer, before the actual adhesive application can take place. Then, a suitable adhesive is applied to the components, which are joined and clamped or held together by appropriate jigs, and then the adhesive is allowed to cure at an elevated temperature and pressure in an autoclave for a sufficient amount of time to ensure adequate and proper bonding of the stringers 12 onto the skin sheet 11. Thereafter, the bonded components must be cleaned, and excess adhesive must be removed. Further, the adhesive joints must be protected against corrosion by applying a bead of an appropriate sealant, and then an additional protective coating to protect against attack by aggressive media.

On the other hand, the above mentioned riveting process for joining the stringers 12 onto the skin sheet 11 is similarly complicated, time-consuming, and costly. Namely, the components must be subjected to a rather complicated preparation process, especially for achieving adequate surface protection. Namely, the skin sheet 11 and the stringers 12 must be anodized, coated with a primer, cleaned with an activator along the joint surfaces, and provided with a sealant along the joint surfaces. Also, a complicated rivet hole boring, cleaning and preparation process must be carried out. Only thereafter can the actual riveting process be carried out. Then the rivets 15 are inserted into the mating holes, and upset or riveted to secure the stringers 12 onto the skin sheet 11.

Thereafter, angle bracket elements, particularly so-called clips 13, are riveted onto the stringers 12 and onto the skin sheet 11. This riveting process also involves the complicated and time consuming steps that were described above. In a further assembly process, the actual crosswise or circumferential frames 14 are joined onto the fuselage shell 10 being fabricated. Particularly, the frame 14 is riveted onto the respective angle bracket elements or clips 13. During this process, the above described complicated, time consuming and costly preparation measures and application of a suitable sealant are necessary at least on certain areas of the fuselage shell or skin.

SUMMARY OF THE INVENTION

In view of the above it is an object of the invention to provide a structural component and especially a structural panel or shell component that has a simplified structure and construction, so that it can be fabricated with a simpler, less costly and less time consuming fabrication process, whereby the fabrication time and fabrication costs of the component can be reduced. It is a further object of the invention to provide such a suitable simplified and less costly fabrication process. The invention more particularly aims to avoid complicated riveting and adhesive bonding process and the associated preparatory steps, and to achieve varying dimensions or thicknesses of the structural component at different areas in a simple and economical manner. The invention further aims to avoid or overcome the disadvantages of the prior art, and to achieve additional advantages, as apparent from the present specification.

The above objects have been achieved according to the invention in a structural panel component, especially a shell component for an aircraft fuselage, which comprises at least one skin sheet and a plurality of stiffening elements running in the longitudinal direction and in the crosswise direction on the skin sheet. The term "structural panel component" encompasses both a flat planar plate or panel component and a curved or contoured shell component. Particularly according to the invention, the longitudinal stiffening elements and the crosswise or transverse stiffening elements are respectively integral with the skin sheet, so that the overall structure including the stiffening elements and the skin sheet is one single monolithic integral piece. According to the invention, this single monolithic integral piece was fabricated by a material chip removing process applied to a suitable semi-finished part. Thus, the finished component has characteristics resulting from having been formed by chip removal machining and particularly milling from a single monolithic solid plate of a starting material. Such characteristics include a fully integral structure, a uniform metal composition and grain pattern and orientation throughout different parts of the component, and a lack of joints, gaps or interruptions, for example.

The above objects have further been achieved according to the invention in a method of fabricating a structural component, wherein a high speed milling process carried out with a large-format or large-area milling machine is used to mill a flat or curved plate-shaped semi-finished part. The milling is carried out according to the proper pattern and requirements to form from the starting plate, a monolithic completely integral structural component including a remaining skin sheet and remaining stiffening elements running integrally along the skin sheet in longitudinal and crosswise or transverse directions.

According to the invention, it is advantageous that the production or fabrication of the structural component using the high speed milling process is optimized from a process point of view, and totally avoids the previously necessary, costly and complicated processes for either adding, thickening or strengthening members or alternatively removing material from the sheet thickness in order to achieve a weight-saving structural component. By using high speed milling to remove material from a semi-finished plate member, it is easy to achieve relatively simply structured, yet very detail-rich structural components, and especially structural shell components. Thereby, various joint locations are also avoided, which minimizes the risks of corrosion and the like.

As a further advantage, the number and variety of separate parts that are needed for fabricating the structural component can be significantly reduced. This in turn significantly simplifies and reduces the effort and complexity of material disposition, storage and warehousing logistics, networking of the construction, tracking of the fabrication or finishing steps, quality control, and the like. Also, when designing new components or the like, relatively few individual parts need to be changed.

According to further detailed or preferred aspects of the invention, the thickness of the remaining skin can be varied in several steps, as necessary, and the dimensions, spacing, etc. of the stiffening elements can be varied as necessary, to appropriately match the resulting local strength of the structural component to the respective loads that will prevail in a given respective area of the structural component. Such variations can be carried out without much effort or expense, simply by providing an appropriate control of the high speed milling process. For example, the process may be controlled by an appropriate computer numerical control (CNC).

Particularly, the stringers can have individual thickness steps, or simply stiffening webs may be provided with any required stepped-down or stepped-up thickness, which is easily achieved with a chip-removing process such as a milling process. A frame element may be joined respectively onto a frame supporting web that is integrally formed with the skin sheet. For example, the frame element may be laser welded onto the frame supporting web. This provides a very strong integral load introduction from the frame into the skin sheet and vice versa. A preferred end use application of the inventive structural component is as a structural shell component of an aircraft fuselage.

The inventive method may be substantially automated, so that the overall fabrication process can be substantially automated. A load optimized component design or structure can easily be achieved, or changed when necessary, by simply providing an appropriate process control, for example through a computer numerical control of the high speed milling process and the laser beam welding process. Such a laser beam welding process will provide a high welding process speed. The combination of the high speed milling and the high speed laser beam welding is thus a very advantageous combination that considerably reduces the fabrication time, effort, and expense.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 4:
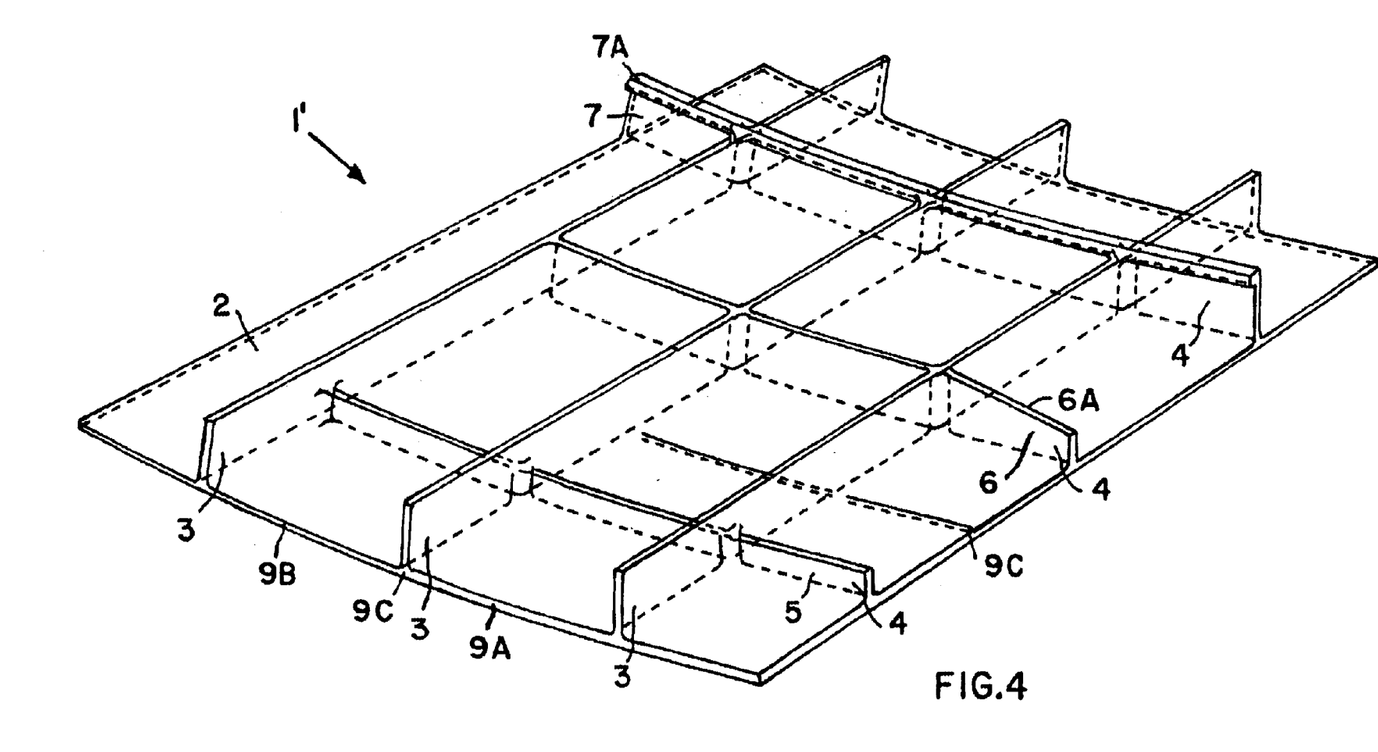
FIG. 4 is a schematic perspective view similar to FIG. 1, but showing a structural component according to the invention, embodied as a fuselage shell component with a curved contour configuration.

A portion of a conventionally fabricated aircraft fuselage shell 10 has been described above in connection with FIG. 3. That structure should be contrasted with the inventive structure shown in FIGS. 1 and 2. While FIGS. 1 and 2 show a substantially flat planar structural panel component, it should be understood that the present invention also applies to two- and three-dimensionally curved or contoured structural shell components, such as the aircraft fuselage shell component 1' as shown in FIG. 4.

Figure 1:
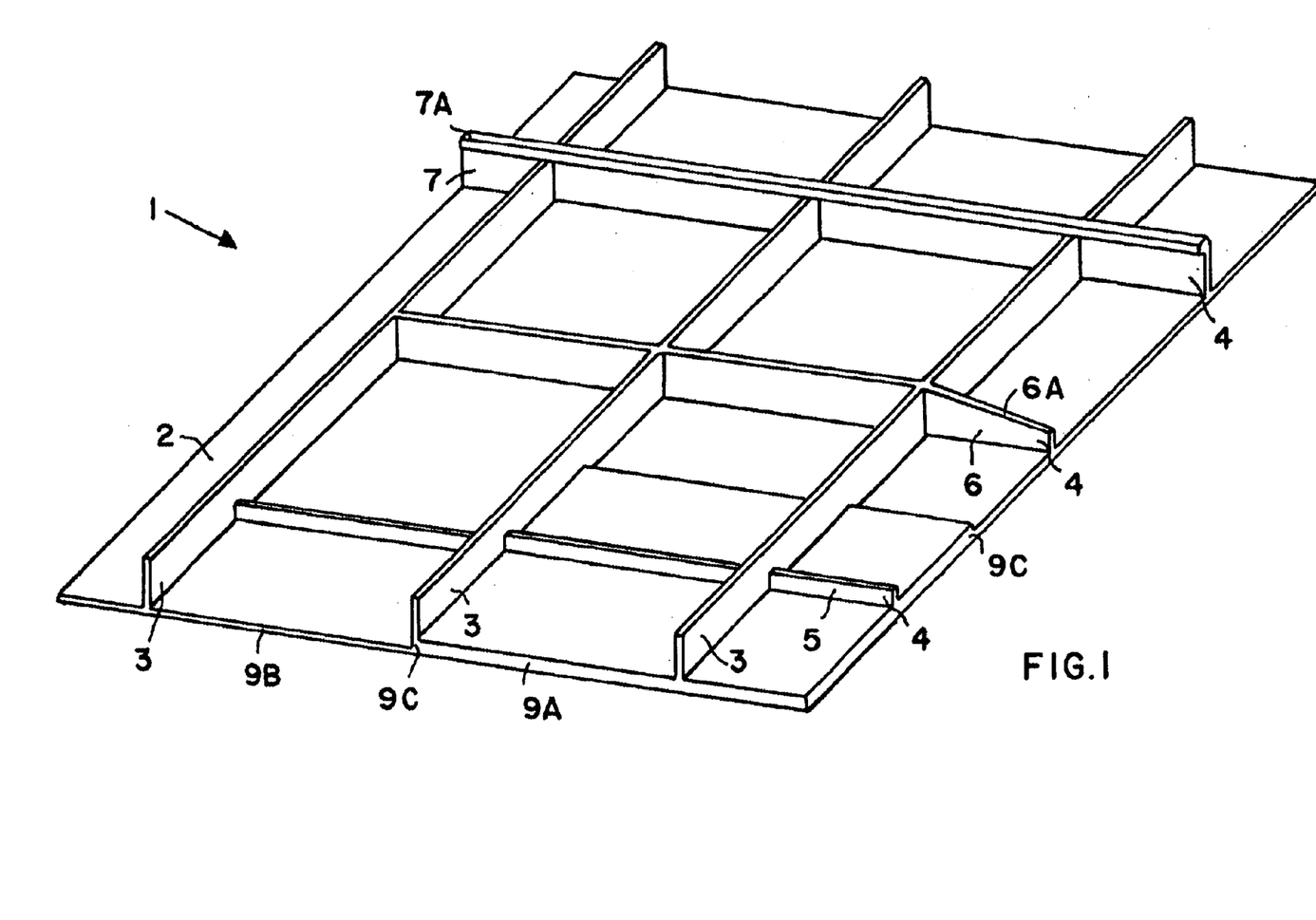
FIG. 1 is a schematic perspective view of a structural component according to the invention.
Figure 2:
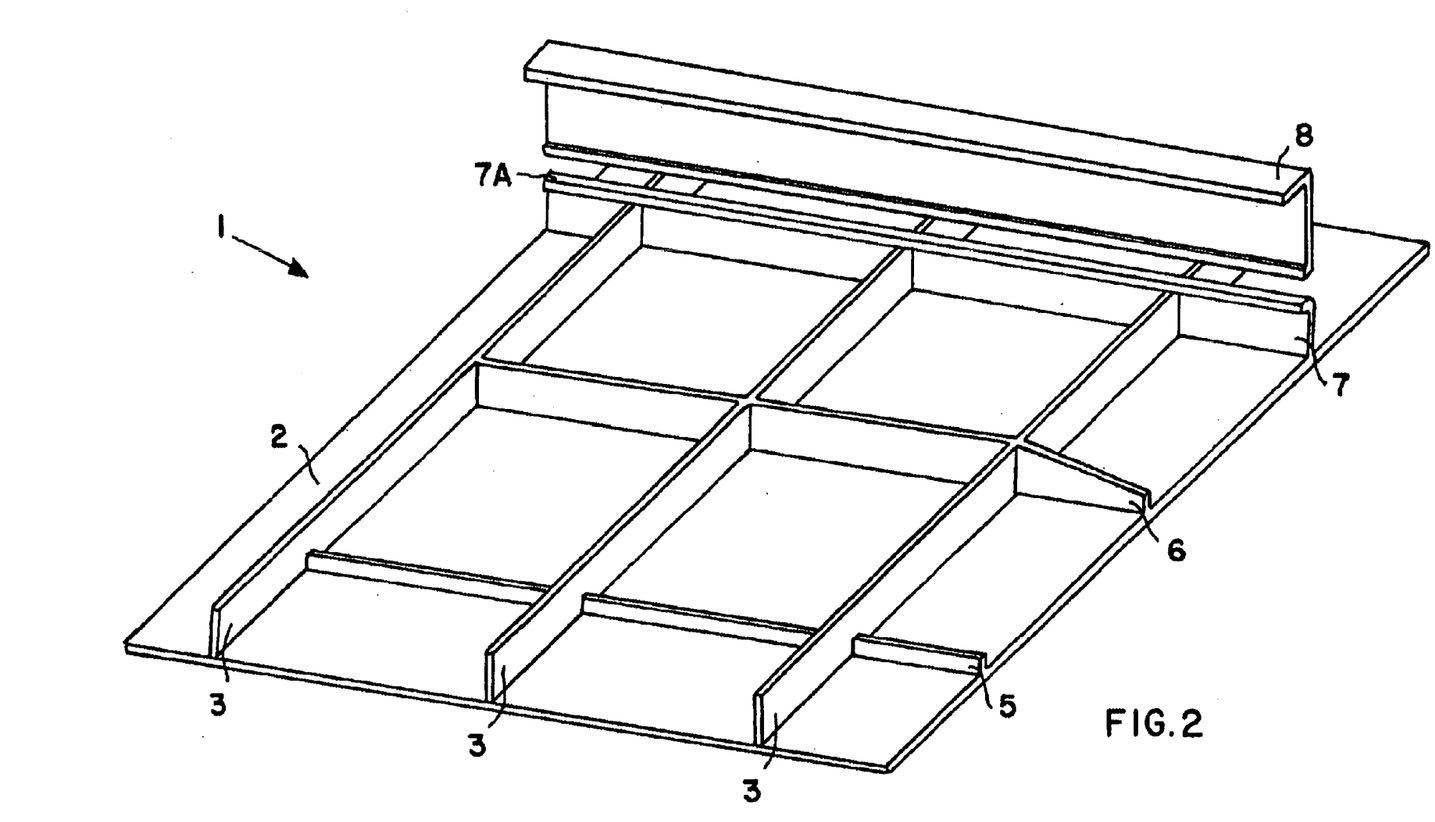
FIG. 2 is a schematic perspective view of the structural component according to FIG. 1, with a frame member ready to be joined thereon.

FIG. 1 schematically shows such a large-format structural component 1 that essentially comprises a skin sheet 2 with longitudinally extending stiffening elements 3 and crosswise or transverse extending stiffening elements 4 arranged thereon. The structural component 1 is integrally embodied as one monolithic piece, i.e. it is apparent that the stiffening elements 3 and 4 integrally protrude from and are integral extensions of the same material as the skin sheet 2, and the elements 3 integrally intersect and are integrally joined with the elements 4 at respective integral, solid, continuous intersections. Thus, the elements 3 and 4 are each single-ply, solid, continuous uninterrupted elements, and the skin sheet 2 is a continuous, imperforate, uninterrupted sheet without gaps and with a continuous, uninterrupted outer surface. This is achieved by forming the structural component 1 from a one-piece semi-finished part in the form of a monolithic solid plate which may have dimensions of 10 m by 2.5 m by 35 mm, for example, corresponding substantially to the maximum finished dimensions of the structural component. The type of large-format structural component to be manufactured according to the invention has a minimum size of, for example, 1 m by 3 m by 20 mm.

Material is removed from this plate-shaped semi-finished part to result in the configuration shown in FIG. 1. The material removal is achieved by means of high speed milling, which is characterized by a significant increase of the spindle rotational speed as well as the drive power of the milling equipment. Such high speed milling directly achieves an increase of productivity or production output. For example, the present conventional speed milling is characterized by a spindle rotational speed of 3000 r.p.m. versus the high speed milling especially for the invention has a rotational speed in the range between 10,000 and 40,000 rpm.

In comparison to the above described conventional structural component 10 shown in FIG. 3, the present inventive integral structural component 1 provides a significant reduction of the manufacturing costs and fabrication complexity and effort. In the present particular embodiment in which the structural component 1 is a structural shell component 1 for an aircraft fuselage, the longitudinally extending stiffening elements 3 are embodied as stringers 3 that will extend in the longitudinal direction of the respective finished aircraft. The stringer spacing between the respective successive stringers 3 in the crosswise or transverse direction can be minimized, which makes it possible to provide thinner stringer geometries, which in turn achieves weight advantages in comparison to the conventional structural component. This also improves the rip-stopping or crack-propagation stopping characteristics.

The stiffening elements 4 extend crosswise or transversely relative to the stringers 3, and serve to stiffen the structural component in the opposite direction and, for example, make it possible to reduce the effective unsupported buckling length of the stringers, while also improving the acoustic (e.g. vibration noise emitting) characteristics of a given rectangular field of the skin sheet.

The crosswise or transverse stiffening elements 4 are particularly embodied, in FIGS. 1 and 2, as supporting or bracing webs 5 and 6, which respectively have different web heights in a direction perpendicular to or protruding from the skin sheet 2. Particularly, the supporting web 5 has a lesser or smaller height while the supporting web 6 has a greater height and therefore provides greater structural strength in comparison to the supporting web 5. The protruding height and the thickness of each supporting web 4, as well as the spacing between adjacent webs 4, will be designed and provided dependent on the loads that will be applied to the respective local area of the structural component in its final end use application. As can also be seen in FIGS. 1 and 2, the protruding height of the supporting web 6 is gradually tapered or reduced along a sloping contour 6A, from a greater height to a smaller height, to provide a smooth step-free transition corresponding to a change of the required load strength from one area to the next.

It is also apparent that the skin sheet 2 itself may have different thicknesses at different areas, depending on the prevailing loads in those areas. For example, the skin sheet 2 includes a relatively thinner area 9B and a relatively thicker and therefore stronger area 9A as shown in FIG. 1. In the illustrated embodiment, the variation of the skin thickness between the area 9A and the area 9B occurs abruptly along a distinct step transition 9C. This step transition 9C may be located either directly along one of the stringers 3 or one of the supporting webs 4, or may be positioned in an open field between respective adjacent stringers or supporting webs. This allows the strength of the skin sheet to be very particularly tailored or adapted to the local strength requirements, either together with or independently from the variation of the stringers and crosswise webs. As a further alternative, the transition of the skin thickness from a thicker area to a thinner area can be a gradual tapering transition rather than a distinct step transition.

The above discussion makes clear that the geometry of the structural component 1 can have a great variety of different configurations, arrangements, and adaptations of the stringers 3, the supporting webs 4, and the skin sheet 2 itself. This allows the strength of the structural component to be locally matched to the expected local loading conditions with high precision and with essentially no unnecessary excess material, therefore achieving the minimum possible weight. This particularized adaptation of the structural component to the local loading conditions or other requirements of the components can be achieved in a rather simple, quick, and economical manner by forming the structural component 1 as a single monolithic integral piece by a material removal process and particularly a high speed milling process applied to a single, solid, monolithic, integral plate member as a starting material or semi-finished part.

The high speed milling process can be readily controlled by a numerical control (NC) system such as a computer numerical control (CNC), so that the total fabrication process for fabricating the structural component can be automated to a great extent. The characterizing parameters or configuration data of the desired configuration of the structural component 1 are simply programmed into the numerical control, and the milling operation then proceeds automatically under this numerical control. Preferably, the same geometrical data that were generated or developed for the structural design of the aircraft or other equipment for which the structural component 1 is being fabricated, can be used for generating the numerical control program for controlling the milling fabrication process. Thereby, the effort and expense of generating the required control data is also minimized.

Production of the structural component 1 in this manner using a numerically controlled milling machine can thus be realized without any fabrication assembly workers, without fabrication assembly steps (such as boring, clamping, workpiece preparing, riveting, bonding, sealing, priming, etc. as discussed above), and without a great number of separate parts. Moreover, the load-optimized configuration of the structural component 1 is easily achieved through the computer supported process control. In comparison, the conventionally fabricated fuselage shell component 10, which has been discussed above in connection with FIG. 3, requires a large number of various different parts to be assembled with a substantial amount of labor effort, whereby any variations or changes would be rather complicated and costly.

FIGS. 1 and 2 further show another transverse stiffening element 4 comprising a frame web 7 that integrally comprises a connection surface or connection flange 7A onto which a further element is to be connected. FIG. 2 shows a frame member 8 that is to be connected or joined onto the frame web 7. This demonstrates an important consideration for the present fabrication process. Since the milled component according to the invention is a single monolithic integral component milled from a solid monolithic plate of the material, such as an aluminum alloy or other metal alloy, the maximum thickness of the finished structural component, i.e. the maximum protruding height of any stiffening element plus the thickness of the remaining skin sheet, is limited to the original thickness of the plate-like starting material. Therefore, if most of the stiffening elements will have a finished height that is within a certain limited range, e.g. 35 mm, and only a few of the stiffening elements need to have a protruding height greater than that, then it would not be economical to provide the plate-shaped starting material with the thickness required to fabricate the few larger or higher stiffening elements.

Instead, the thickness of the starting material plate is selected to be adequate for the required finished protruding height of the great majority of the stiffening elements, but individual stiffening elements that require greater strength and therefore a greater protruding height, will be formed of an additional member, such as the frame member 8 being joined onto an underlying frame supporting web 7. In this manner, the required amount of material removal by the milling process, and the starting material cost can be optimized in terms of economy.

The frame element 8 is preferably separately fabricated, for example as an extrusion molded profile element. Alternatively, the frame element 8 could be fabricated by stamping, pressing and bending a sheet material, or it could be fabricated by a material chip removal process such as by milling the element 8 from a solid plate of material. In any event, the frame element 8 is provided as a previously fabricated part, and is then joined onto the frame web 7 by any conventionally known joining process, but preferably using laser beam welding to weld the frame element 8 onto the connection flange 7A of the frame web 7. In this manner, the most optimum, economical, and effective combination of the high speed milling process and the laser welding process can be achieved, to provide an overall simple and economical fabrication process for the structural component 1.

While it is not shown in the drawings, it should be understood that the starting material in the form of a solid plate of the selected material, is initially provided either in a flat planar configuration, especially for fabricating a flat planar finished component 1, or in a curved or contoured plate configuration, especially for fabricating a similarly curved or contoured finished structural component 1. Thus, the first step of the present fabrication process can be regarded as providing or forming the plate-shaped starting material by any conventionally known process, including casting, sheet extrusion, rolling, press forging, and the like. Such conventionally known processes are employed to make the plate-shaped starting member with the proper plate dimensions (width, length and thickness) as well as any required two-dimensional or three-dimensional curvature of the finished structural component 1. The milling operation is then carried out while supporting the plate-shaped starting material on an appropriate supporting jig or the like. For a curved or contoured structural component 1, the milling operation and particularly the numerical control of the milling operation of course takes into account the curved contour.

Once a plurality of structural components 1 have been fabricated according to the invention, e.g. having different respective configurations and shapes as required, these structural components may be assembled together in any conventionally known manner to form a fuselage shell or a section thereof. For example, the respective structural components may be riveted or welded together along longitudinal and circumferential joints.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of fabricating a structural panel component to claim comprising a one-piece integral component that includes:

a continuous uninterrupted skin sheet;

first stiffening elements protruding integrally from a first surface of said skin sheet and extending in a longitudinal direction; and second stiffening elements protruding integrally from said first surface of said skin sheet and extending in a transverse direction crosswise relative to said longitudinal direction;

wherein:

said second stiffening elements integrally intersect and are integrally continuous with said first stiffening elements at respective integral intersections;

said skin sheet has a continuous uninterrupted cap-free second surface opposite said first and second stiffening elements;

said skin sheet has a curved contour configuration, and at least some of said stiffening elements have a curved configuration extending along said curved contour configuration of said skin sheet; and wherein said method comprises the following steps:

a) providing a semi-finished starting material as a curved starting material plate; and b) removing material from said plate by high speed milling, to leave said skin sheet and said stiffening elements remaining thereon and thereby form said structural panel component from said plate.

2. The method according to claim 1, wherein said step a) comprises providing said plate as a solid plate of a metal material, with dimensions of at least 1 meter by at least 3 meters by at least 20 millimeters.

3. The method according to claim 1, wherein said step b) comprises using a large surface area milling machine to perform said high speed milling, and further comprises controlling said high speed milling by a numerical control.

4. The method according to claim 1, further comprising a step of specifying component geometry data that specifies at least one of a relatively thinner area of said skin sheet, a relatively thicker area of said skin sheet, a relatively greater height portion of said stiffening elements, a relatively lesser height portion of said stiffening elements, a relatively wider portion of said stiffening elements, and a relatively narrower portion of said stiffening elements, depending on local load conditions to which respective areas of said structural panel component will be subjected in use, and then numerically controlling said removing of material based on said component geometry data so that said structural panel component will have a geometry as specified by said component geometry data.

5. The method according to claim 1, after said step b), further comprising an additional step of joining a frame member onto and along at least one of said stiffening elements.

6. The method according to claim 5, wherein said joining comprises laser welding.

7. The method according to claim 5, further comprising a preliminary step of forming said frame member by extrusion.

8. The method according to claim 5, further comprising a preliminary step of forming said frame member by removing material from a solid plate by a material chip removal process.

9. A structural panel component comprising
a one-piece integral component that includes:
a continuous uninterrupted skin sheet;
first stiffening elements protruding integrally from a first surface of said skin sheet and extending in a longitudinal direction; and
second stiffening elements protruding integrally from said first surface of said skin sheet and extending in a transverse direction crosswise relative to said longitudinal direction;
wherein:
said second stiffening elements integrally intersect and are integrally continuous with said first stiffening elements at respective integral intersections;
said skin sheet has a continuous uninterrupted gap-free second surface opposite said first and second stiffening elements;
said skin sheet includes a first skin area with a first skin thickness and a second skin area with a second skin thickness that is thicker than said first skin thickness; and
said integral component has been formed by carrying out a material chip removing process on a semi-finished starting material and said integral component has at least some product characteristics as result from said material chip removing process.

10. The structural panel component according to claim 9, wherein said skin sheet has a flat planar configuration and said stiffening elements respectively have a straight linearly extending configuration.

11. The structural panel component according to claim 9, wherein said first skin area and said second skin area integrally adjoin each other at a step transition between said second skin thickness of said second skin area and said first skin thickness of said first skin area.

12. The structural panel component according to claim 11, wherein said step transition extends directly along one of said stiffening elements.

13. The structural panel component according to claim 11, wherein said step transition is located in an open skin field of said skin sheet between and not along respective ones of said stiffening elements.

14. The structural panel component according to claim 9, wherein said one-piece integral component is an integral component of a metal, and said skin sheet, said first stiffening element, said second stiffening elements, and said semi-finished starting material consist of said metal.

15. The structural panel component according to claim 9, wherein:
said one-piece integral component is an integral component of a metal, and said skin sheet, said first stiffening elements, said second stiffening elements, and said semi-finished starting material consist of said metal; and
said skin sheet has a curved contour configuration, and at least some of said stiffening elements have a curved configuration extending along said curved contour configuration of said skin sheet.

16. The structural panel component according to claim 15, wherein said structural panel component is an aircraft fuselage shell component, said first stiffening elements are longitudinally extending stringers, and said second stiffening elements are circumferentially extending strengthening brace members.

17. The structural panel component according to claim 16, wherein said stringers respectively consist of a flat-sided web protruding from said skin sheet, without a flange protruding laterally from said web.

18. The structural panel component according to claim 15, excluding rivets and excluding adhesive.

19. The structural panel component according to claim 15, having panel area dimensions of at least 1 meter by 3 meters.

20. The structural panel component according to claim 15, wherein said integral component is entirely a single solid monolithic one-piece integral component and excludes all non-integral joints.

21. The structural panel component according to claim 15, wherein said skin sheet is entirely a solid imperforate skin sheet, and said stiffening elements are each solid single-ply elements.

22. A structural panel component comprising
a one-piece integral component that includes:
a continuous uninterrupted skin sheet;
first stiffening elements protruding integrally from a first surface of said skin sheet and extending in a longitudinal direction; and
second stiffening elements protruding integrally from said first surface of said skin sheet and extending in a transverse direction crosswise relative to said longitudinal direction;
wherein:
said second stiffening elements integrally intersect and are integrally continuous with said first stiffening elements at respective integral intersections;
said skin sheet has a continuous uninterrupted gap-free second surface opposite said first and second stiffening elements;

said second stiffening elements comprise bracing webs that include first web portions having a first protrusion height from said skin sheet and second web portions having a second protrusion height from said skin sheet, wherein said second protrusion height is larger than said first protrusion height; and said integral component has been formed by carrying out a material chip removing process on a semi-finished starting material and said integral component has at least some product characteristics as result from said material chip removing process.

23. The structural panel component according to claim 22, wherein said bracing webs further include transition portions that each have a tapering protrusion height between said larger protrusion height of said second web portions and said smaller protrusion height of said first web portions.

24. A structural panel component comprising
a one-piece integral component that includes:
    a continuous uninterrupted skin sheet;
    first stiffening elements protruding integrally from a first surface of said skin sheet and extending in a longitudinal direction;
    second stiffening elements that include a frame supporting web and that protrude integrally from said first surface of said skin sheet and extend in a transverse direction crosswise relative to said longitudinal direction; and
    a frame member extending along and joined onto said frame supporting web so as to protrude from said frame supporting web away from said skin sheet;
wherein:
    said second stiffening elements integrally intersect and are integrally continuous with said first stiffening elements at respective integral intersections;
    said skin sheet has a continuous uninterrupted gap-free second surface opposite said first and second stiffening elements; and
    said integral component has been formed by carrying out a material chip removing process on a semi-finished starting material and said integral component has at least some product characteristics as result from said material chip removing process.

25. The structural panel component according to claim 24, wherein said frame member is joined onto said frame supporting web by a laser weld seam.

\* \* \* \* \*

UNITED STATES PATENT AND TRADEMARK OFFICE
CERTIFICATE OF CORRECTION

PATENT NO.    : 6,684,593 B2
DATED         : February 3, 2004
INVENTOR(S)   : Brenneis et al.

It is certified that error appears in the above-identified patent and that said Letters Patent is hereby corrected as shown below:

Column 8,
Line 42, before "comprising", delete "to claim".

Column 10,
Line 16, before "said" (first occurrence), replace "element," by -- elements, --.

Signed and Sealed this

Twentieth Day of April, 2004

JON W. DUDAS
*Acting Director of the United States Patent and Trademark Office*